United States Patent
Pacht

[19]

[11] Patent Number: 5,362,109
[45] Date of Patent: Nov. 8, 1994

[54] QUICK DISCONNECT FOR HIGH PRESSURE FLUID LINE

[75] Inventor: Amos Pacht, Houston, Tex.

[73] Assignee: Butterworth Jetting Systems, Inc., Houston, Tex.

[21] Appl. No.: 34,102

[22] Filed: Mar. 22, 1993

[51] Int. Cl.5 .............................................. F16L 35/00
[52] U.S. Cl. ...................................... 285/39; 285/92; 285/49; 285/354; 285/388
[58] Field of Search .................... 285/49, 39, 354, 92, 285/387, 388

[56] References Cited

U.S. PATENT DOCUMENTS

| | | |
|---|---|---|
| Re. 22,309 | 5/1943 | Guarnaschelli . |
| 503,433 | 8/1893 | McIntyre .................. 285/392 X |
| 710,768 | 10/1902 | Ford .......................... 285/354 |
| 883,080 | 3/1908 | Bullock . |
| 883,122 | 3/1908 | Steneck . |
| 1,517,761 | 12/1924 | Sorenson et al. . |
| 2,148,746 | 2/1939 | Hampe et al. . |
| 2,148,747 | 2/1939 | Hampe et al. . |
| 2,301,038 | 11/1942 | Guarnaschelli . |
| 2,330,864 | 10/1943 | Bruno . |
| 2,489,338 | 11/1949 | Stork et al. . |
| 2,511,396 | 6/1950 | Brekke . |
| 2,601,536 | 10/1954 | Tamminga . |
| 3,116,944 | 1/1964 | Parker . |
| 3,361,453 | 1/1968 | Brown et al. . |
| 3,476,414 | 11/1969 | Condral ..................... 285/354 X |
| 3,488,072 | 1/1970 | Allen et al. . |
| 3,880,451 | 4/1975 | Kinzbach . |
| 4,165,106 | 8/1979 | Gladden ..................... 285/354 X |
| 5,131,695 | 7/1992 | Wiser ........................ 285/354 |

FOREIGN PATENT DOCUMENTS

| | | |
|---|---|---|
| 222736 | 12/1958 | Australia .................... 285/354 |
| 1707 | of 1906 | United Kingdom ......... 285/354 |
| 984947 | 3/1965 | United Kingdom ......... 285/354 |

Primary Examiner—Dave W. Arola
Attorney, Agent, or Firm—Jones, Day, Reavis & Pogue

[57] ABSTRACT

A quick disconnect forming a coupler for high pressure fluid lines that has a first hollow member attached to a second hollow member in fluid-tight relationship with an attachment collar having relatively coarse threads thereon for quick attachment and detachment of the first and second members. A cylindrical stop ring is threadedly attached to one of the members to form a second shoulder in spaced opposition to a first shoulder on one of the members such that the attachment collar can move axially only between the two shoulders. A resilient O-ring is formed in a recess on the second member and engages an annular recess on the attachment collar to resist movement of the attachment collar by vibration.

5 Claims, 2 Drawing Sheets

QUICK DISCONNECT FOR HIGH PRESSURE FLUID LINE

BACKGROUND OF THE INVENTION

1. Field of the Invention

The present invention relates in general to coupling devices and specifically to a quick disconnect coupling device for a high pressure fluid line.

2. Description of Related Art

Quick disconnect couplers are advantageously used in any fluid distribution system for quickly disconnecting one coupler from another to open a fluid line. Special problems occur in quick disconnect couplers for high pressure fluid lines. The coupler must be secure during the existence of the high pressure fluid in the line and yet must be easily uncoupled when the high pressure fluid is removed. U.S. Pat. No. 2,511,396 discloses one such type of quick action coupling. It has a socket member, a sleeve-like securing means and a stem member. A tapered projection on the stem member extends through the sleeve-like securing means and is inserted into the socket member. Spaced lugs on the stem member engage openings in the sleeve-like securing means such that when the sleeve-like securing means is rotated with respect to the stem, the lugs lock the sleeve-like securing means to the stem. The combined unit can then be threadedly attached to the socket member. Clearly, if the sleeve-like member should rotate with respect to the stem member, the coupler could inadvertently be uncoupled and, with high pressure fluid therein, could provide a dangerous condition.

U.S. Pat. No. 3,361,453 also discloses a quick coupling device for coupling pipes together. One pipe member has a collar slidably mounted thereon and has coarse threads on the inside diameter. The other pipe has a recess in the outer end thereof which when inserted in the collar and the collar threadedly rotated, latch rings, having beveled surfaces, are compressed and forced into the annular groove on the other pipe, thus locking the pipes together. This arrangement is complex and involves latching rings, bearing rings, annular grooves and recesses for locking the two pipes together.

SUMMARY OF THE INVENTION

The present invention overcomes the disadvantages of the prior art by providing a simple, quick disconnect coupling for high pressure fluid lines with simply four components. First and second members are threadedly attached to respective high pressure fluid conduits and are to be coupled to each other. The first member has a first outside diameter, a second outside diameter smaller than the first and forming a shoulder or flange, and a third outside diameter smaller than the second diameter that has relatively fine coupling threads thereon. An attaching collar slides over the second diameter of the first member and engages the flange or shoulder. A cylindrical stop ring is threadedly attached to the third diameter of the first member to form a second annular shoulder spaced from and opposing the first annular shoulder such that the attaching collar is free to move only between the first and second shoulders. The attachment collar has generally coarse quick disconnect threads on the inside thereof. The second member has a forwardly extending cylindrical projection that is matingly received by a cylindrical recess in the first member. The second member has relatively coarse threads on the outside circumference thereof. The attaching collar can then be moved towards the second member and by rotating the attaching collar the relatively coarse threads on the attaching collar engage the relatively coarse threads on the second member and quickly couple the first and second members together. An O-ring or annular seal in the cylindrical recess in the first member engages the forwardly extending cylindrical projection on the second member to provide a fluid-tight connection. An annular groove is formed in the second member at the base of the coarse threads and a resilient member such as an O-ring is inserted therein. A corresponding annular recess is formed in the outer end of the attaching collar such that when the attaching collar has been rotated to attach the first and second members together, the resilient O-ring in the second member engages the annular recess in the attaching collar to provide a frictional engagement that resists any movement of the attaching collar because of vibration.

Because the cylindrical stop ring has relatively fine threads thereon, for example, 15 to 20 threads per inch, it provides a secure shoulder or flange for retaining the attaching collar so that it is difficult to work loose from the first member. In order to sufficiently tighten the cylindrical stop ring, spaced orifices are formed in the periphery of the cylindrical stop ring and a special tool having corresponding projections thereon is used to tighten the cylindrical stop ring as it is threaded on the first member.

Thus, it is a feature of the present invention to provide a quick disconnect for a high pressure coupler that is simple and efficient to operate.

It is also a feature of the present invention to provide first and second members forming a quick disconnect coupler for a high fluid pressure line with the first member having a first shoulder thereon and a cylindrical stop ring with an outside diameter such that it forms a second shoulder spaced from the first shoulder to retain an attaching collar on the first member.

It is yet another feature of the present invention to provide a quick disconnect for a high pressure fluid line that utilizes an attaching collar with coarse threads and a resilient O-ring engaging the attaching collar in its fully attached position such that frictional engagement of the O-ring and the attaching collar resists loosening of the attaching collar by vibration.

It is still another feature of the present invention to provide a quick disconnect for a high pressure fluid line that is simple and efficient to operate and yet has a consistent thickness for providing safety in handling the high pressure fluid.

Thus, the present invention relates to a quick disconnect for a coupler for a high pressure fluid line comprising a first hollow member having first and second spaced flanges forming shoulders on the outside circumference, a hollow cylindrical attaching collar surrounding the first men, bet such that the collar can move only in the space between the first and second shoulders, relatively coarse threads on the inside of at least a portion of the attaching collar, the relatively coarse threads being in the range of four-to-six threads per inch, a second member having mating relatively coarse threads on the outside circumference thereof for matingly engaging the threads on the inside of the attaching collar, the coarse threads allowing quick attachment and detachment of the attaching collar to the second member.

BRIEF DESCRIPTION OF THE DRAWINGS

These and other objects of the present invention will be more fully understood when in taken in conjunction with the attached detailed description of the drawings in which like numerals represent like elements and in which.

DETAILED DESCRIPTION OF THE DRAWINGS

Figure 1:
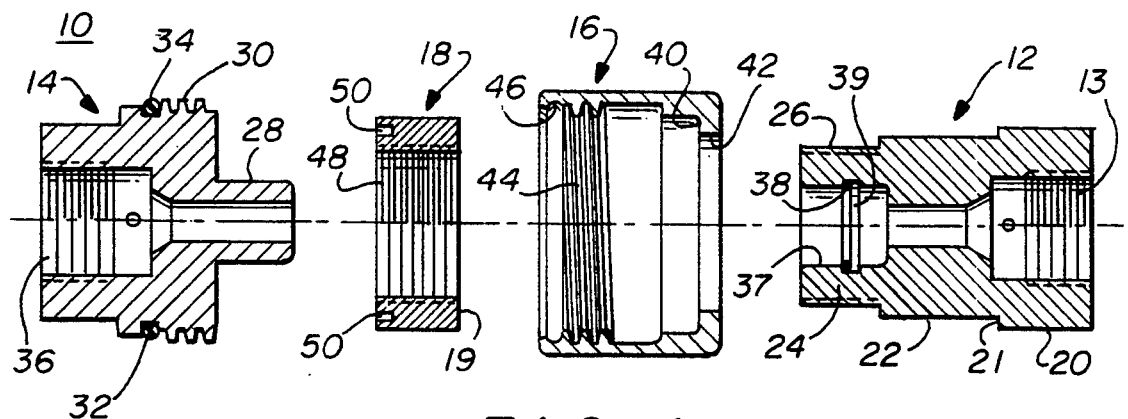
FIG. 1 is an exploded cross-sectional view illustrating the four components forming the present invention.

An exploded cross-sectional view of the novel quick disconnect 10 is illustrated in FIG. 1. It comprises a first member 12 for threaded connection at 13 to a conduit for carrying high pressure fluid, a second member 14 for threaded connection at 36 to a second conduit carrying high pressure fluid, an attaching collar 16 having relatively coarse threads for attaching the first and second members 12 and 14 together and a cylindrical stop ring 18 that has relatively fine threads for threaded attachment to corresponding threads 26 on the first member 12. The first member 12 has a first portion 20 with a first outside diameter and a second portion 22 having a second outside diameter that is smaller than the first diameter of first portion 20, thus forming an annular shoulder or flange 21. A third portion 24 has a third outside diameter that has threads 26 thereon and is smaller than the second outside diameter or portion 22. In addition, a cylindrical recess 37 is formed in the first coupling member 12. Recess 37 has an annular groove 39 therein that contains an O-ring seal 38.

The attaching collar 16 has a shoulder 40 formed by an orifice 42. Orifice 42 is of sufficient diameter to slidably mount the collar 16 on the second diameter of second portion 22 of the first fluid receiving member 12 such that shoulder 40 contacts the annular flange or shoulder 21 on first member 12. Attaching collar 16 also has relatively coarse threads 44, such as 4-to-6 threads per inch and, at the outer end of the coarse threads 44, an annular recess 46 is formed on the inside of the collar 16.

The cylindrical stop ring 18 has relatively fine threads 48 therein and, when the attaching collar 16 is slipped over the second diameter (22) of the first member 12, the cylindrical stop ring 18 can be threadedly attached to the outer end or third diameter (24) having threads 26 thereon.

The second member 14 has a forwardly extending cylindrical projection 28 which can then be inserted in the cylindrical recess 37 in the first member 12 to enable the attaching collar 16 to be threadedly engaged with the relatively coarse threads 30 on the second member 14. The O-ring 38 in annular groove 39 formed in recess 37 of first member 12 forms a fluid-tight seal with the forwardly extending projection 28 on the second member 14. Thus the first and second members can be drawn towards each other as the attaching collar 16 engages the threads 30 of second men%her 14. The annular recess 46 in the attaching collar 16 engages the resilient or rubber O-ring 34 such that when the attaching collar 16 is tight, O-ring 34 will resist loosening due to vibration because of the frictional engagement of annular recess 46 with the resilient O-ring 34.

Figures 2, 3:
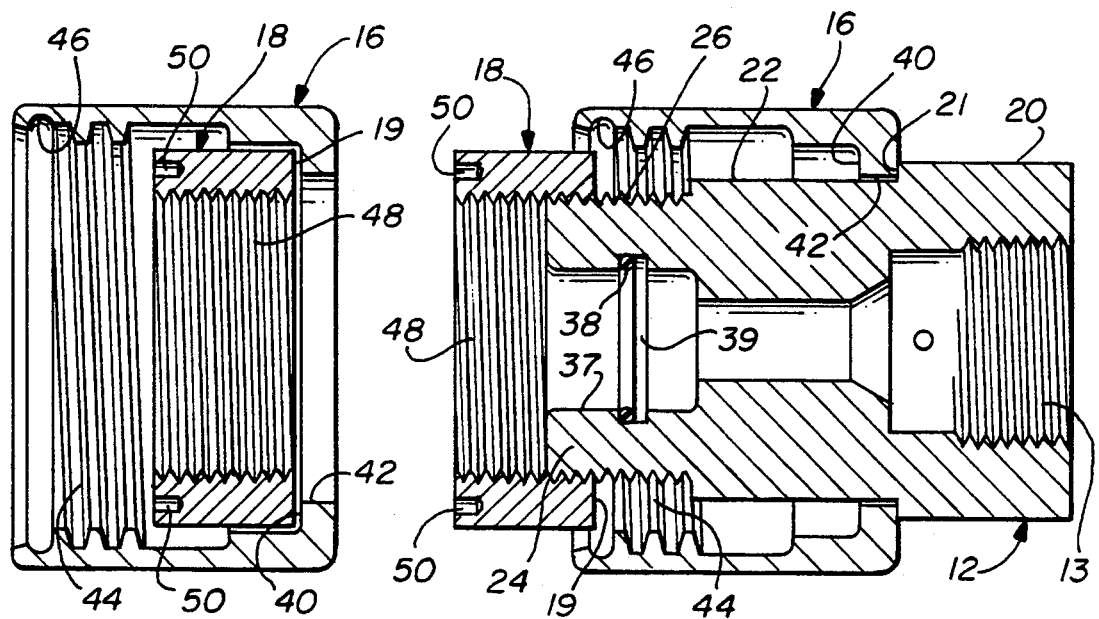
FIG. 2 is a cross-sectional view of the attaching collar with a cylindrical stop ring therein that forms a shoulder or flange against which the attached collar abuts.
FIG. 3 is a cross-sectional view of a first member of the quick disconnect with the cylindrical stop ring being threaded thereon to provide opposing shoulders between which the attaching collar is free to move.

FIG. 2 illustrates the cylindrical stop ring 18 in cross section positioned within the attaching collar 16, also shown in cross section. It can be seen that the cylindrical stop ring 18 engages shoulder 40 of attaching collar 16 and cannot pass through the orifice 42 therein. Thus, cylindrical stop ring 18 forms a stop or flange 19 which shoulder 40 on attaching collar 16 cannot pass as will be shown in FIG. 4.

FIG. 3 illustrates the beginning of the assembly of the novel quick disconnect. As can be seen in FIG. 3, the attaching collar 16 has been slipped on the second diameter (22) of first member 12. The cylindrical stop ring 18 can then be threaded on the relatively fine threads 26 of end portion 24 of the first member 12 having the third diameter.

Figure 4:
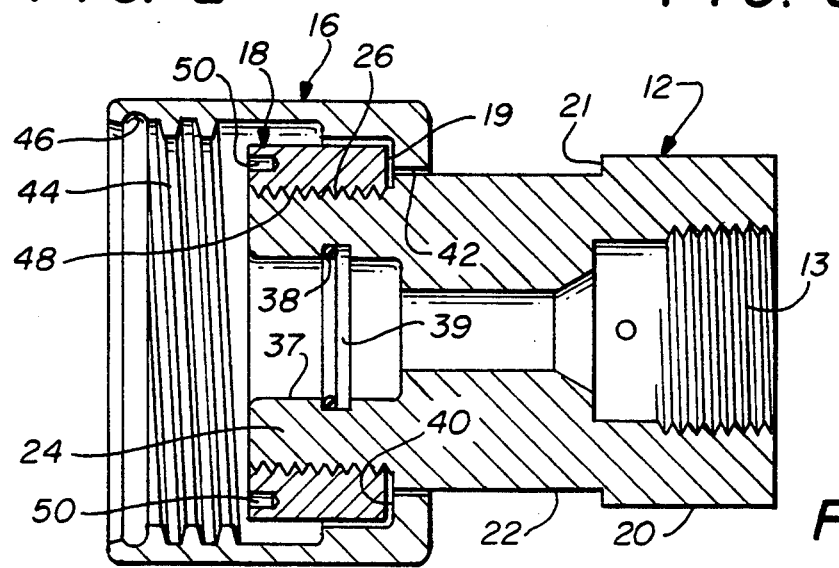
FIG. 4 is a cross-sectional view of the first fluid receiving member of FIG. 3 with the cylindrical stop ring fully threaded thereon and illustrating the first and second shoulders between which the attaching collar is free to move.

FIG. 4 illustrates in cross section the complete assemblage of first member 12, attaching collar 16 and cylindrical stop ring 18. As can be seen, with cylindrical stop ring 18 fully threaded on end portion 24 of first member 12, a shoulder 19 is formed which is opposed to and spaced apart from shoulder 21 formed by the second diameter (22) of the first member 12. The two shoulders 19 and 21 allow the attaching collar to freely move in an axial direction only between shoulders 19 and 21. The relatively fine threads on stop ring 18 hold it securely on first member 12.

Figure 5:
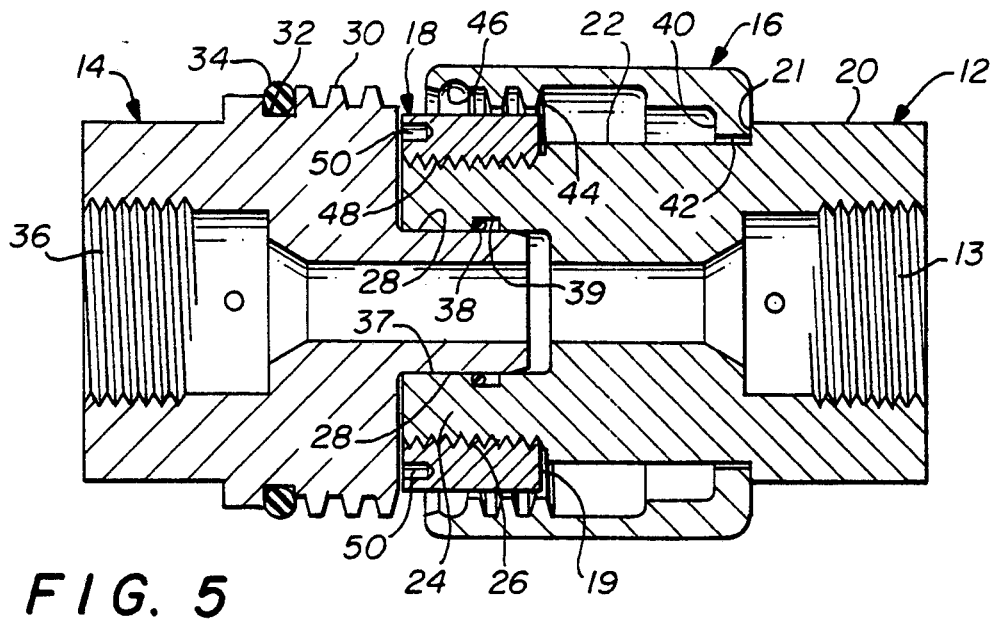
FIG. 5 is a cross-sectional view of a second fluid receiving member having a forwardly extending cylindrical projection inserted in a cylindrical recess in the first fluid receiving member in preparation for the attaching collar to be threaded thereon.

FIG. 5 illustrates the second member 14 having its forwardly extending cylindrical projection 28 inserted in the cylindrical recess 37 in first member 12 such that the O-ring 38 is in contact with the projection 28 thus forming a fluid-tight seal. In this position, the attaching collar 16 can be simply slipped to the left in FIG. 5 until its threads 44 engage threads 30 on second member 14. At that point the attaching collar 16 is rotated but because of the relatively coarse threads 30 and 44, a short rotation of one turn or less fully engages the attaching collar 16 with the second member 14.

Figure 6:
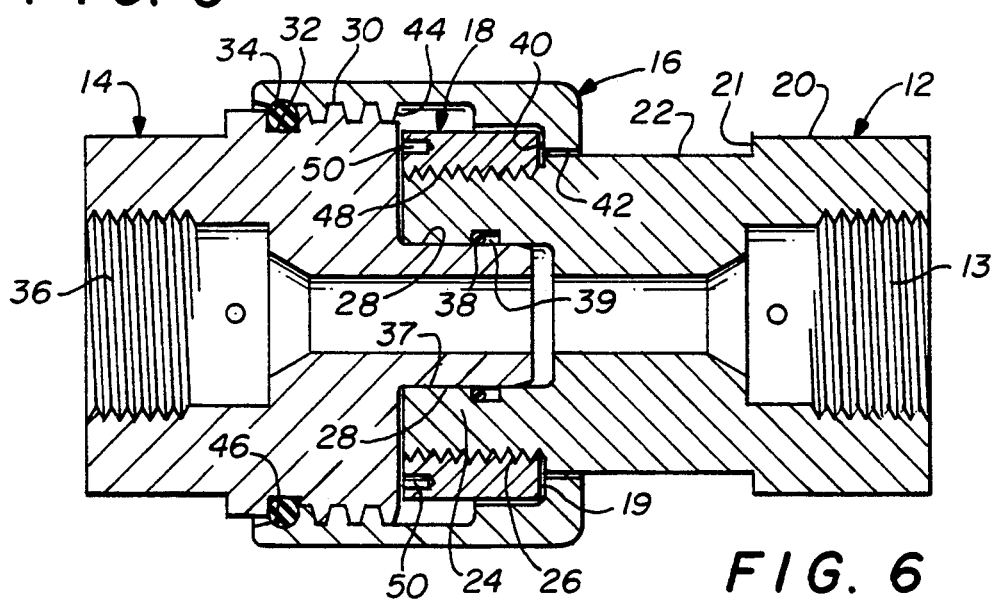
FIG. 6 is a cross-sectional view of the entire coupler assembly in its completely assembled state.

This condition is illustrated in FIG. 6 in which attaching collar 16 has been threadedly engaged to its maximum extent with the relatively coarse threads on second member 14. At this point, the rubber O-ring 34 is centered within the annular recess 46 on collar 16 thus causing a frictional engagement which resists any loosening of the attaching collar 16 because of vibration. It requires a positive pressure on the attaching collar 16 to threadably release it.

Because of the relatively fine threads on the cylindrical stop ring 18 and the relatively fine threads 26 on the outside of end portion 24 of the third diameter or portion of first member 12, many turns of the cylindrical stop ring 18 are required to completely threadedly attach it to the first member 12. A special tool is needed to attach the stop ring 18 to the first member 12. Thus, cylindrical stop ring 18 has a plurality of orifices 50 about the periphery thereof for receiving a like plurality of corresponding extensions on a special tool such as shown in FIGS. 7, 8 and 9 such that the cylindrical stop ring 18 can be tightly threaded on the external threads 26 on the end portion 24 having the third outside diameter of the first member 12.

Figures 7, 8, 9:
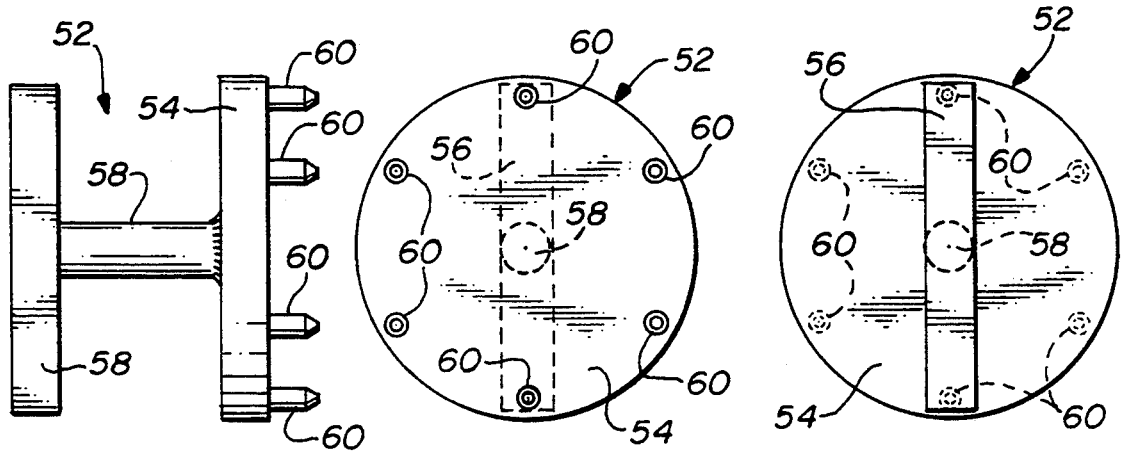
FIG. 7 is a side view of a tool for attaching the cylindrical stop ring to the first fluid receiving member.
FIG. 8 is an end view of the tool in FIG. 7 as viewed from the right end in FIG. 7.
FIG. 9 is an end view of the tool in FIG. 7 as viewed from the other end in FIG. 7.

As can be seen in FIG. 7, the tool 52 that is used to turn the cylindrical stop ring 18 when it is in the positions illustrated in FIGS. 3 and 4 includes a base portion 54 having a plurality of spaced cylindrical projections 60 thereon, a handle 56 and a connecting portion 58. As can be seen in FIG. 8, which is the bottom view of the tool in FIG. 7 as viewed from the right side, six cylindrical extensions 60 are included to fit into a like number of corresponding cylindrical orifices 50 in the cylindrical stop ring 18. FIG. 9 is a side view from the left end of the tool in FIG. 7 and illustrates the rectangular shaped handle 56 which can be grasped by the user after the projections 60 have been inserted in the orifices 50 of the cylindrical stop ring 18 and the handle 56 is rotated to thread the stop ring 18 on the threads 26 of the first member 12.

Because the attaching collar 16 is held in place by cylindrical stop ring 18 having relatively fine threads 48, the attaching collar is held securely in place while allowing it to have axial movement only between shoulder 21 on first member 12 and shoulder 19 formed by cylindrical stop ring 18.

An input high pressure conduit is threadedly connected at 13 to first member 12 and a second high pressure conduit is threadedly connected with threads 36 to the second member 14. Because the coupler carries high pressure fluid up to 20,000 psi and greater, it is important that thickness of the coupler be maintained to avoid any weak spots. Because the cylindrical stop ring 18 is threaded on the end portion 24 of the first member 12 having the least thickness, the thickness of the material in the area of the first diameter 20 where the coupling to the fluid line is made can be increased. There is no retaining ring required as in the prior art. The retaining rings do not always hold satisfactorily in high pressure coupling systems. Further, the thickness of the coupler is maintained throughout the coupler since, at the center portion, the forwardly extending projection 28 of second member 14, the end portion 24 of the first member 12 and the cylindrical stop ring 18 all combine to form a large thickness at the weakest point. Thus, the novel coupler is simple to manufacture and to operate with only four components to assemble. Further, the first and second elements 12 and 14 can be quickly attached and detached because of the relatively coarse threads used on the attaching collar 16 and the second member 14.

Thus, there has been disclosed a novel quick disconnect for a high pressure coupler that has first and second members that mate with each other in fluid transfer relationship. They are attached to each other with relatively coarse threads so that the units can be quickly attached and detached from each other. First and second spaced flanges form shoulders that contain an attaching collar and allow it to move axially only between the first and second shoulders. A resilient O-ring engages the attaching collar to provide a frictional force that resists loosening of the attaching collar by vibration.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A quick disconnect for a high pressure coupler comprising:

a first member having a first inside diameter for carrying high pressure fluid and having a first outside diameter;

a second member mating with the first member in fluid transfer relationship and having relatively coarse threads on the external circumference thereof;

a first shoulder formed on the first member by a second smaller outside diameter;

an attaching collar mounted on the second outside diameter and having an inside diameter such that axial movement of the collar in one direction is limited by the first shoulder on the first member, the collar having relatively coarse threads on the inside thereof for mating with the relatively coarse threads on the second member so as to enable the attaching collar to be quickly attached to and detached from the second member;

a third outside diameter on the first member smaller than the second diameter and having relatively fine coupling threads thereon;

a cylindrical stop ring threadedly attached to the relatively fine coupling threads of the third outside diameter of the first member to form a second shoulder such that the attaching collar is free to move axially only between the second shoulder on the stop ring and the first shoulder on the first member; and a forwardly extending cylindrical projection on the second member for mating with a cylindrical recess in the first member such when the forwardly extending projection of the second member is inserted in the cylindrical recess of the first member, the attaching collar may be moved axially to threadedly engage the second member for attachment of the first and second members.

2. A quick disconnect for a high pressure coupler comprising:

a first generally cylindrical fluid receiving coupling member having first, second and third outside diameters thereon, the second diameter forming a first annular shoulder with the first diameter;

a cylindrical recess formed in one end of the first coupling member;

an attachment collar slidably mounted on the second outside diameter of the first coupler and engaging the first annular shoulder formed by the second diameter, the attaching collar having relatively coarse quick disconnect threads on the inside thereof;

relatively fine threads formed on the third outside diameter of the first coupler;

a cylindrical stop ring threadedly attached to the third outside diameter of the first coupler and having an annular flange that forms a second annular shoulder spaced from and opposing the first annular shoulder such that the attaching collar is free to move axially only between the first and second shoulders; and a second generally cylindrical coupling member having a hollow extension for partial insertion in the first coupler cylindrical recess and having relatively coarse quick disconnect threads on the outside thereof for mating threaded engagement with the quick disconnect threads on the attachment collar to hold the first and second coupling members securely attached to each other in a quick disconnect relationship.

3. A quick disconnect as in claim 2 further including an annular seal in the cylindrical recess of the first coupler for forming a fluid-tight coupling between the first and second couplers.

4. A quick disconnect as in claim 3 further including:

an annular groove at the base of the quick disconnect threads on the outside of the second coupling member;

a resilient O-ring in the annular groove; and a mating annular recess in front of the quick disconnect threads on the inside of the attaching collar such that when the attaching collar's relatively coarse threads are in complete engagement with the mating threads on the outside of the second coupling member, the O-ring is received by the attaching collar recess to hold the attaching collar in frictional engagement with the second coupling member to resist loosening of the attaching collar by vibration.

5. A quick disconnect as in claim 2 further including:

a plurality of spaced orifices extending axially in the periphery of the annular flange of the stop ring for receiving a like plurality of corresponding extensions on a tool such that the flange can be tightly threaded on the relatively fine external threads on the third outside diameter of the first coupler.

* * * * *